(12) United States Patent
Zana et al.

(10) Patent No.: US 11,147,040 B1
(45) Date of Patent: Oct. 12, 2021

(54) METHODS AND SYSTEMS FOR DISCOVERING PARAMETERS ASSOCIATED WITH PAGING DEVICES SENT IN PACKETS DURING PAGING PROCESS

(71) Applicant: CYBERTOKA Ltd., Tel Aviv (IL)

(72) Inventors: Guy Zana, Holon (IL); Yuval Solodnik, Tel Aviv (IL); Baruch Weizman, Givatayim (IL)

(73) Assignee: CYBERTOKA Ltd., Tel Aviv (IL)

( * ) Notice: Subject to any disclaimer, the term of this patent is extended or adjusted under 35 U.S.C. 154(b) by 0 days.

(21) Appl. No.: 17/228,823

(22) Filed: Apr. 13, 2021

(51) Int. Cl.
*H04W 68/02* (2009.01)
*H04W 72/04* (2009.01)
*H04W 68/00* (2009.01)

(52) U.S. Cl.
CPC ......... *H04W 68/02* (2013.01); *H04W 68/005* (2013.01); *H04W 72/0453* (2013.01)

(58) Field of Classification Search
CPC ............... H04W 68/02; H04W 68/005; H04W 72/0453
See application file for complete search history.

(56) References Cited

U.S. PATENT DOCUMENTS

2014/0072083 A1* 3/2014 Hulvey ............... H04L 7/041
375/365
2019/0052308 A1* 2/2019 Niu ...................... H04B 1/7143

FOREIGN PATENT DOCUMENTS

WO    WO-2011134647 A1 * 11/2011 ........... G08G 1/0141

* cited by examiner

*Primary Examiner* — Joshua L Schwartz
(74) *Attorney, Agent, or Firm* — Mark M. Friedman

(57) ABSTRACT

Computerized methods and systems obtain information associated with a first device attempting to connect with a second device that has a MAC address having an LAP and UAP. A transceiver is tuned to a frequency band at least covering a first channel represented in one or more candidate channel sequences, and receives a first packet transmitted by the first device. One or more second channels that each immediately follow the first channel in a corresponding one of the one or more candidate channel sequences are identified. The transceiver is tuned to a frequency band at least covering one of the second channels, and receives a second packet transmitted by the first device. A controller/processor processes the received second packet to determine whether the second packet is a valid packet. If the packet is a valid packet, the controller/processor extracts information from the second packet.

19 Claims, 5 Drawing Sheets

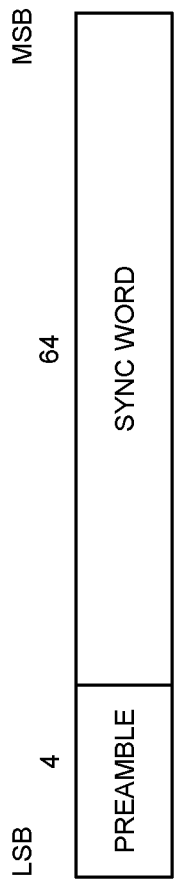
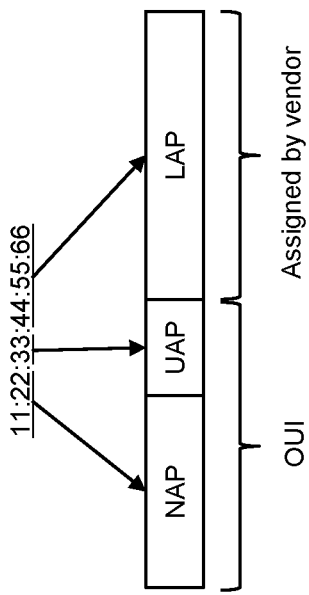
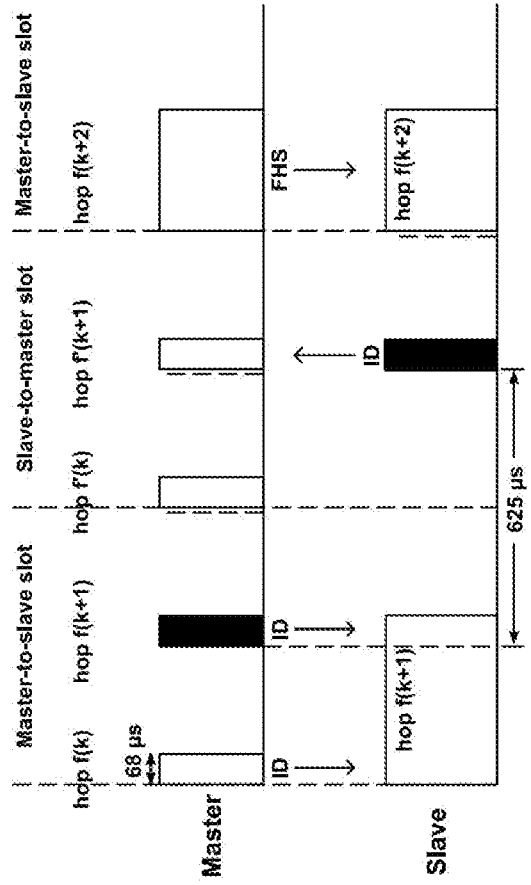
FIG. 2
FIG. 1
FIG. 3

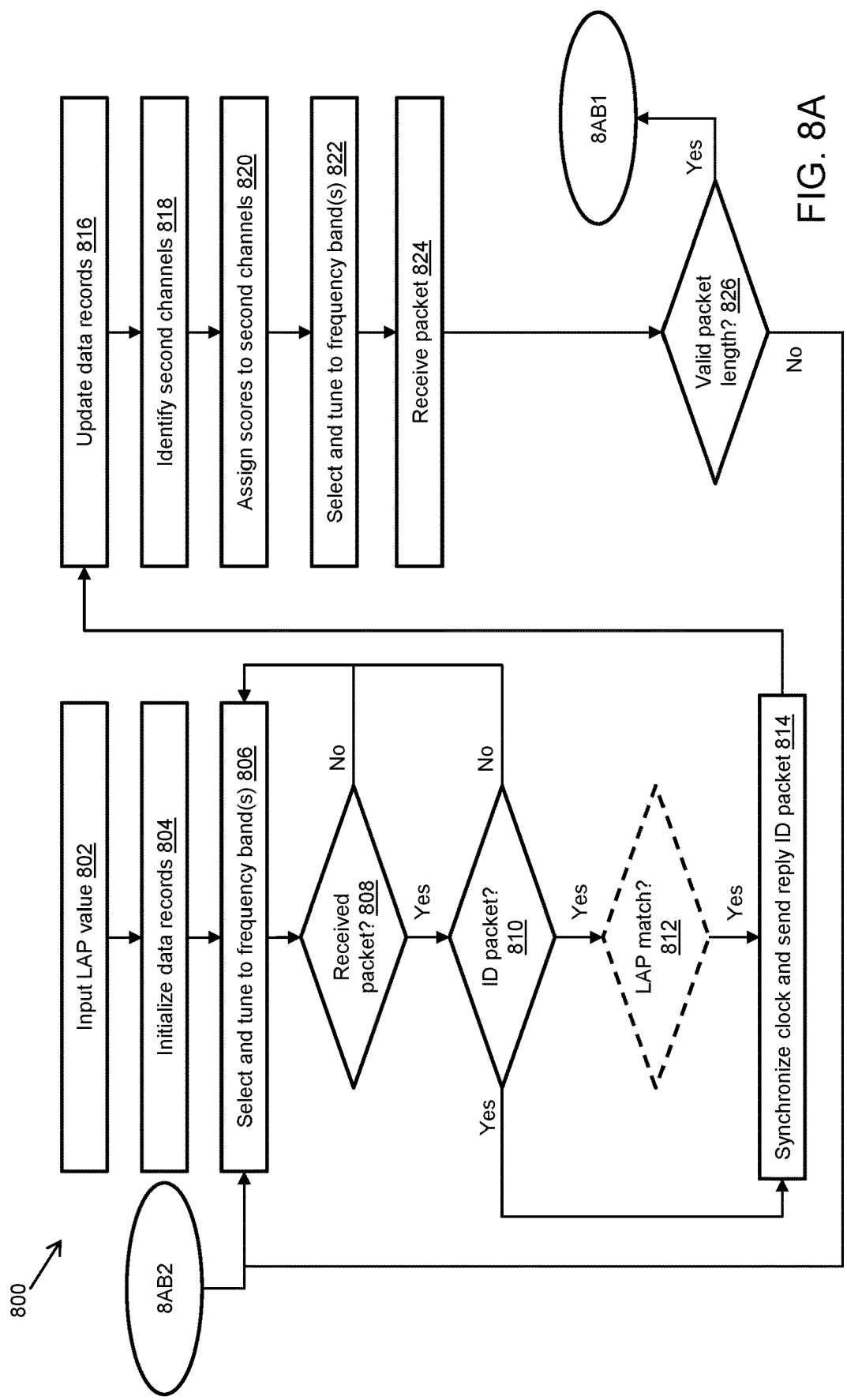

METHODS AND SYSTEMS FOR DISCOVERING PARAMETERS ASSOCIATED WITH PAGING DEVICES SENT IN PACKETS DURING PAGING PROCESS

CROSS-REFERENCE TO RELATED APPLICATIONS

This application is related to commonly owned U.S. patent application Ser. No. 17/146,544, filed on Jan. 12, 2021, entitled Methods and Systems for Discovering Media Access Control (MAC) Addresses, whose disclosure is incorporated by reference in its entirety herein.

TECHNICAL FIELD

The present invention relates to communication between wireless devices over communication networks using the Bluetooth® Basic Rate or Bluetooth® Enhanced Data Rate protocol.

BACKGROUND OF THE INVENTION

Bluetooth® is a well-known wireless technology standard for exchanging data between electronic devices over short distances. Bluetooth® (abbreviated and referred to hereinafter as BT) is widely adopted and supported by a wide range of electronic devices, such as, for example, mobile phones, desktop computers, laptop computers, printers, headsets, home and car entertainment systems, and medical devices.

The BT standard uses a master-slave architecture that supports the creation of a piconet in which one master device can communicate with several (typically up to seven) slave devices. In order to establish communication between the master and slave devices, the master and slave must first establish a connection with one another using a process referred to as paging.

SUMMARY OF THE INVENTION

The present invention is directed to computerized methods and systems for ascertaining (identifying, extracting, discovering, etc.) parameters and/or information associated with paging devices that are carried in packets sent by the paging device.

Embodiments of the present invention are directed to a method for obtaining information associated with a first device attempting to establish communication with a second device having a media access control (MAC) address that includes a lower address part (LAP) and an upper address part (UAP). The method comprises: receiving a first packet, transmitted by the first device, at a transceiver while tuned to a frequency band at least covering a first channel represented in one or more candidate channel sequences, each candidate channel sequence being based on an LAP value and a corresponding candidate UAP value; identifying one or more second channels that each immediately follow the first channel in a corresponding one of the one or more candidate channel sequences; receiving a second packet, transmitted by the first device, at the transceiver while tuned to a frequency band at least covering one of the second channels; and processing the received second packet to determine whether the second packet is a valid packet.

Optionally, the method further comprises: transmitting, by the transceiver, a reply packet to the first device in response to receipt of the first packet at the transceiver, and wherein the first device transmits the second packet in response to receipt of the reply packet.

Optionally, processing the received second packet includes: extracting information from the received second packet if the received second packet is determined to be a valid packet.

Optionally, the information includes at least one of: the LAP of the first device, the UAP of the first device, a device type designating a type of the first device, a number of most significant bits of a clock of the first device.

Optionally, processing the received second packet includes: checking a length of the received second packet.

Optionally, the second packet is whitened by the first device prior to transmission using a linear feedback shift register that is initialized using values of a clock of the second device.

Optionally, processing the received second packet includes: un-whitening the second packet using a candidate value of a clock associated with the second device in order to generate a candidate un-whitened packet.

Optionally, processing the received second packet further includes: un-whitening the second packet using a different candidate value of the clock if the candidate un-whitened packet is not a valid packet.

Optionally, the first device previously established communication with the second device.

Embodiments of the present invention are directed to a system for obtaining information associated with a first device attempting to establish communication with a second device having a media access control (MAC) address that includes a lower address part (LAP) and an upper address part (UAP). The system comprises: a transceiver configured to receive a first packet, transmitted by the first device, while tune to a frequency band at least covering a first channel represented in one or more candidate channel sequences, each candidate channel sequence based on an LAP value and a corresponding candidate UAP value; and a controller in communication with the transceiver and configured to identify one or more second channels that each immediately follow the first channel in a corresponding one of the one or more candidate channel sequences, the transceiver being further configured to receive a second packet, transmitted by the first device, while tuned to a frequency band at least covering one of the second channels, and the controller being further configured to process the received second packet to determine whether the second packet is a valid packet.

Optionally, the controller is further configured to instruct the transceiver to transmit a reply packet to the first device in response to receipt of the first packet at the transceiver, and wherein the first device transmits the second packet in response to receipt of the reply packet.

Optionally, the controller is configured to extract information from the received second packet if the controller determines that the received second packet is a valid packet.

Optionally, the information includes at least one of: the LAP of the device, the UAP of the device, a device type designating a type of the device, a number of most significant bits of a clock of the device.

Optionally, the controller is configured to process the received second packet by at least checking a length of the received second packet.

Optionally, the second packet is whitened prior to transmission by the first device using a linear feedback shift register that is initialized using values of a clock of the second device.

Optionally, the controller is configured to process the received second packet by at least: un-whitening the received second packet using a candidate value of a clock associated with the second device in order to generate a candidate un-whitened packet.

Optionally, the controller is further configured to process the received second packet by un-whitening the received second packet using a different candidate value of the clock if the controller determines that the candidate un-whitened packet is not a valid packet.

Optionally, the system further comprises: an interface associated with the controller for inputting to the controller an LAP value representative of the LAP of the second device.

Embodiments of the present invention are directed to a method that is performed during a process initiated by a first device to establish communication with a second device, each of the first and second devices having a media access control (MAC) address that includes a lower address part (LAP) and an upper address part (UAP). The method comprises: receiving as input an LAP value representative of the LAP of the second device; initializing a UAP data record to include: i) a plurality of candidate UAP values associated with the UAP of the second device, and ii) for each candidate UAP value, a corresponding candidate channel sequence based on the LAP value and the candidate UAP value; receiving at a transceiver a first packet, transmitted by the first device, on a first channel represented in at least one of the candidate channel sequences; identifying at least one second channel that follows the first channel in a corresponding one of the at least one channel sequence; receiving at the transceiver a second packet, transmitted by the first device, on one of the identified at least one second channel; and processing the received second packet using candidate values of a clock of the second device to determine whether the received second packet is a valid packet.

Throughout this document, numerous textual and/or graphical references are made to trademarks. These trademarks are the property of their respective owners, and are referenced only for explanation purposes herein.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1 is a diagram illustrating the structure of the MAC address of an electronic device operating according to the Bluetooth® Basic Rate (BT BR) or Bluetooth® Enhanced Data Rate (BT EDR) protocol standard;

FIG. 2 is a diagram illustrating the structure of an exemplary device access code of an ID packet used by a paging device and a page scanning device during a paging process to establish connection between the paging device and page scanning device FIG. 3 is a timing diagram illustrating the transmission and reception of ID packets during the paging process;

FIGS. 8A and 8B are a flow diagram illustrating a process executed by the system according to embodiments of the present invention.

DESCRIPTION OF THE PREFERRED EMBODIMENTS

Figures 4, 5:
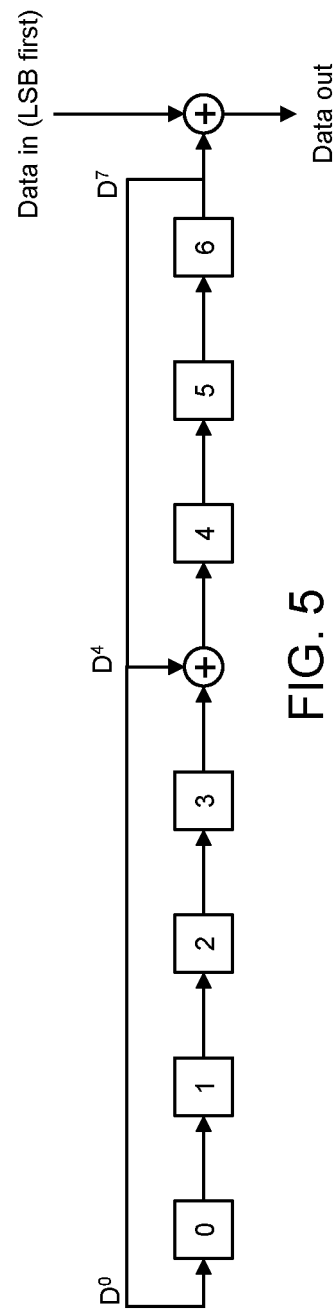
FIG. 4 is a diagram illustrating the structure of an exemplary Frequency Hop Synchronization (FHS) packet transmitted by the paging device during the paging process.
FIG. 5 is a diagram illustrating a Linear Feedback Shift Register (LFSR) used for whitening the header and payload of FHS packets.

The embodiments described herein are applicable to electronic devices that operate according to either of the BT Basic Rate (BT BR) or BT Enhanced Data Rate (BT EDR) protocol standards.

The embodiments of the present invention are directed to computerized methods and systems for ascertaining (identifying, extracting, discovering, etc.) information associated with an electronic device that operates according to a BT protocol. The information is ascertained from parameters of packets, transmitted by the BT electronic device, that carry or contain information associated with the BT electronic device. The packets can be transmitted by the BT electronic device during a process ("paging process") that is initiated by the BT electronic device ("paging device" which becomes a master device) to establish communication between the BT electronic device (paging device) and another BT electronic device ("page scanning device" which becomes a slave device).

The methods and systems according to embodiments of the present invention are applicable to a variety of situations for which it may be desirable to ascertain or extract information associated with a first BT device (that becomes a master device, i.e., a "to-be master") during an attempt by the first BT device to establish a connection with another (second) BT device (that will become a slave, i.e., a "to-be slave"). By way of one non-limiting example, the to-be master BT device can be a BT enabled mobile device (e.g., a smartphone, tablet or laptop computer having a BT transceiver), and the to-be slave BT device can be a BT enabled accessory device such as a BT headset or a BT speaker.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

By way of introduction, each BT device is associated with a 6-byte (48 bit) MAC address. The MAC address is typically assigned to the device by the manufacturer of the device. The MAC address is also referred to as the Bluetooth Device Address (abbreviated as "BD_ADDR"). FIG. 1 illustrates the structure of the BD_ADDR, which is divided into an Organizationally Unique Identifier (OUI) and a Lower Address Part (LAP).

The OUI consists of the first 3 bytes (24 bits) of the MAC address. Each BT device manufacturer (i.e., vendor) uses an OUI prefix from a well-known set of prefixes that is assigned to the manufacturer by the Institute of Electrical and Electronics Engineers (IEEE). Accordingly, the OUI can be used to uniquely identify the manufacturer of a BT device.

The LAP consists of the last 3 bytes (24 bits) of the MAC address, and is typically assigned by the manufacturer of the BT device such that no two BT devices share the same MAC address.

The OUI is also subdivided into a Non-Significant Address Part (NAP) that consists of the first 2 bytes (16 bits) of the MAC address, and an Upper Address Part (UAP) that consists of the third byte of the MAC address.

The UAP and LAP (i.e., the last 4 bytes of the MAC address) together form what is referred to as the Significant Address Part (SAP) of the MAC address.

A BT device is also normally associated with a device name which can in some cases be customized by the end user.

As part of the process for establishing a connection between two BT devices, the BT protocol employs a paging process. During the paging process, a first BT device (often referred to as a "paging device") tries to establish a connection with a second BT device (often referred to as a "page scanning device" or "paged device"). In many cases, a paging device (e.g., a vehicle BT device) will periodically initiate the paging process in order to attempt to connect to page scanning devices (e.g., BT enabled smartphones) that are known to come into, or potentially come into, the vicinity of the paging device. The paging process requires that the paging device has knowledge of the BD_ADDR of the page scanning device. This knowledge could be based on, for example, prior communication/connection between the two devices or through a BT process referred to as an inquiry scan.

The paging process utilizes a sequence of 32 channels. This channel sequence is referred to as a page hopping sequence (PHS). The PHS is derived from the BD_ADDR of the page scanning device. Specifically, the PHS is derived from the 24-bits of the LAP of the MAC address of the page scanning device, and the 4 least significant bits of the UAP of the MAC address of the page scanning device.

It is common practice in the art to refer to the channels of the PHS as hop f(0), hop f(1), . . . , hop f(30), hop f(31) for the page request transmissions made by the paging device.

The responses to page request transmissions are sent by the page scanning device on an identical channel sequence to the PHS known as the page response hopping sequence (PRHS). The channels of the PRHS are referred to as hop f'(0), hop f'(1), . . . , hop f'(30), hop f'(31) for the page request response transmissions. It is noted that for each integer k=0, 1, . . . , 31, hop f'(k)=hop f(k).

In the current BT protocol, BT devices operate at frequencies between 2402 MHz and 2480 MHz (or 2400 MHz and 2483.5 MHz including a guard band that is 2 MHz wide at the bottom and a guard band that is 3.5 MHz wide at the top). The BT operating frequency range is divided into 79 designated channels, where each channel has a bandwidth of 1 MHz. Each transmission is made on one of these 79 channels, and the channels of the PHS and PRHS are selected from the 79 channels. The channels are typically identified using enumerated channel identifiers (IDs) 0-78, where each channel ID corresponds to a different channel center frequency. Thus, for example, channel number 0 can correspond to the 1 MHz wide channel centered at 2402 MHz, channel number 1 can correspond to the 1 MHz wide channel centered at 2403 MHz, and so on and so forth. The last channel, i.e., channel number 78 can correspond to the 1 MHz wide channel centered at 2480 MHz.

It is noted that each of the 79 channels can be represented in the PHS/PRHS once and only once, i.e., no channel appears more than once in a given PRS/PRHS. Put another way, hop f(k)=hop f(n) only if k=n.

The paging process uses ID packets (also referred to as paging packets). An ID packet consists of 68 bits, and unlike most other BT packets, ID packet have no header, payload or trailer. ID packets consist only of a device access code which consists of a 4-bit preamble and a 64-bit sync word. The 64-bit sync word is derived from the 24-bit LAP of the MAC address of the page scanning device. FIG. 2 shows the general structure of the device access code of an ID packet.

Each of the PHS and PRHS is divided into two subsequences of 16 channels, referred to as "trains". Furthermore, the paging process is divided into time slots, where each time slot spans 625 microseconds (μs). During the paging process, the paging device uses one train to transmit two ID packets in every transmission slot. Each ID packet is transmitted on a different channel (e.g., first ID packet on hop f(0), and second ID packet on hop f(1)). Following every transmission slot, there is a reception slot in which the paging device listens on the same two channels (e.g., hop f(0) and hop f(1)) for a response/reply ID packet (also referred to as a "page reply") transmitted by the page scanning device. If no response is received during the reception slot, the paging device transmits another two ID packets on two subsequent channels (e.g., hop f(2) and hop f(3)), followed again by another reception slot in which the paging device listens on the same two channels (e.g., hop f(2) and hop f(3)) for a response ID packet. This process continues until the paging device receives a response ID packet that is identical to the ID packet transmitted by the paging device. If the paging process is unsuccessful (i.e., if no response ID packet is received by the paging device), the paging device repeats the ID packet transmission process above, but this time using the channels of the other train.

Ultimately, if the paging device receives a response ID packet that is identical to the ID packet transmitted by the paging device, the paging device transmits a Frequency Hop Synchronization (FHS) packet. FIG. 3 schematically illustrates the transmission and reception of ID packets during the paging process. Here, the second ID packet is transmitted by the paging device on channel hop f(k+1) in a given transmission slot, resulting in transmission 625 μs later in the reception slot of the paging device (which is also the first transmission slot of the page scanning device) of a reply ID packet by the page scanning device on channel hop f(k+1).

The payload of the FHS packet includes 144 information bits and a 16-bit cyclic redundancy check (CRC) that can be used to check the integrity and/or validity of the payload. FIG. 4 illustrates the information bits of the FHS packet payload. As shown, the information bits include, for example, the LAP, UAP, and NAP of the paging device, as well as the 26 most significant bits of the 28-bit clock of the paging device.

Prior to transmission of the FHS packet, the header and payload of the FHS packet are whitened by applying a bitwise exclusive or (XOR) on the header and payload with the output of a linear feedback shift register (LFSR) whose initial state is derived from the 5 lower bits of the clock of the page scanning device extended with the two most significant bits set to 1. FIG. 5 illustrates a diagram of the LFSR, showing the delay elements and the connections between the delay elements.

The channel used to transmit the FHS packet is the channel in the PHS that immediately follows the channel used by the page scanning device to send the response ID packet (as can be seen in FIG. 3).

After receiving the FHS packet from the paging device, the page scanning device normally acknowledges the receipt of the FHS packet by transmitting another ID packet. This typically completes the paging process, at which point the paging device and the page scanning device become the master and a slave, respectively, and a connection between the two devices is established. The master and the slave can thus form part of a piconet.

Figure 6:
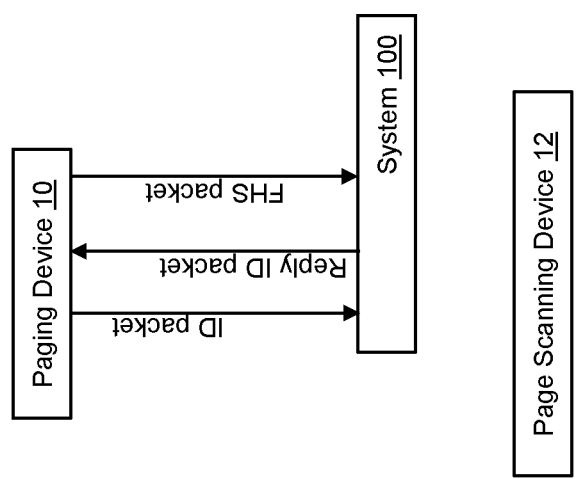
FIG. 6 is a diagram illustrating a system environment in which an embodiment of the invention is deployed.

Bearing all of the above in mind, embodiments of the present invention provide methods and systems which enable ascertaining (identifying, extracting, discovering, etc.) information associated with paging devices that is embedded/contained/carried in FHS packets as parameters of the packet. With particular reference to FIG. 6, there is illustrated an environment in which a system, generally designated 100, according to embodiments of the present disclosure, can be deployed. The system initiates and executes methods during the paging process in which a paging device 10 attempts to establish communication with a to-be slave device. The system effectively can present itself as a page scanning device during the paging process in order to ascertain the aforementioned information. In the non-limiting example environment illustrated in FIG. 6, a page scanning device 12 is also present, but is not required for the system 100 to perform the functions associated with the present invention.

As illustrated in FIG. 6, and as will be described in detail below, the system is configured to receive/intercept ID packets transmitted by the paging device 10 (that could be destined for the page scanning device 12) as part of the paging process that is initiated by the device 10. The system 100 is also configured to respond to such a received ID packet by sending a reply ID packet to the paging device 10 in order to attempt to prompt the paging device 10 to transmit an FHS packet or packets (containing information pertaining to the paging device 10). The system 100 is further configured to identify a set of potential channels on which such an FHS packet will be transmitted by the paging device 10 in response to the transmitted reply ID packet. By identifying the set of potential FHS packet channels, the system 100 can attempt to receive such an FHS packet sent by the paging device 10. As discussed above, FHS packets are whitened by the paging device 10 prior to transmission, and therefore the system 100 is also configured to process packets received on the identified set of potential channels by iterating through candidate initial LFSR states (based on the candidate values of the last five bits of the page scanning device's clock) and to un-whiten the received packets using the LFSR in order to extract information from the FHS packet.

Figure 7:
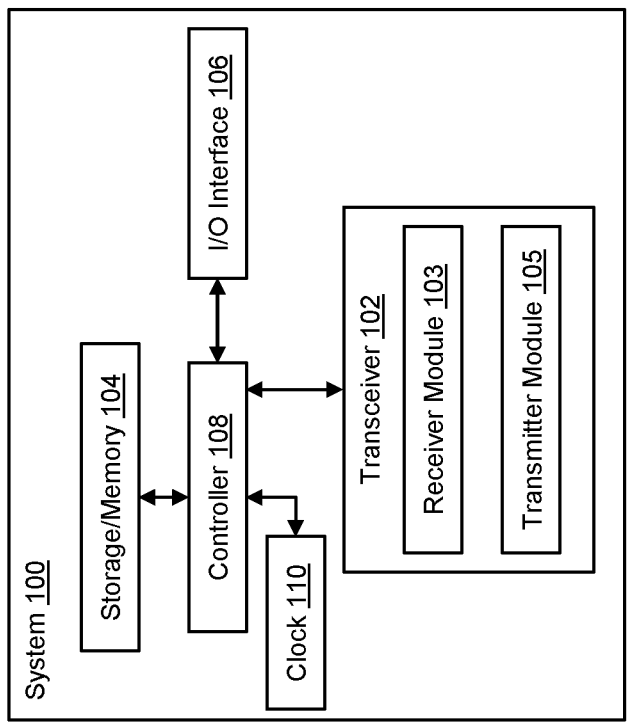
FIG. 7 is a diagram of the architecture of an exemplary system for receiving packets transmitted by paging devices to page scanning devices and ascertaining information contained in the transmitted packets that pertains to the paging devices, according to embodiments of the present disclosure.

With continued reference to FIG. 6, reference is also made to FIG. 7, which illustrates a block diagram of the system 100. Generally speaking, the system 100 includes a radio transceiver 102, a storage/memory 104, an input/output (I/O) interface 106, a controller 108, and a clock 110. All components of the system 100 are connected or linked to each other (via an electronic and/or data communication connection/link), either directly or indirectly.

The controller 108 is formed of one or more processors coupled to a storage medium, such as a memory or the like. The one or more processors can be implemented in various ways, including, for example, as microprocessors, microcontrollers, application-specific integrated circuits, field programmable gate arrays, and the like. In microprocessor implementations, the microprocessors can be, for example, conventional processors, such as those used in servers, computers, and other computerized devices. For example, the microprocessors may include x86 Processors from AMD and Intel, Xeon® and Pentium® processors from Intel, as well as any combinations thereof.

The storage/memory 104 can be any conventional storage media, which although shown as a single component for representative purposes, may be multiple components. The storage/memory 104 can be implemented in various ways, including, for example, one or more volatile or non-volatile memory, a flash memory, a read-only memory, a random-access memory, and the like. In certain embodiments, the storage/memory 104 can include one or more components for storing and maintaining data records, and at least one component configured to store machine executable instructions, associated with the operation of the components of the system 100 and that can be executed, for example, by the controller 108.

The radio transceiver 102, referred to hereinafter as "transceiver", includes a receiver module 103 that includes receiver circuitry and components for receiving signals, and a transmitter module 105 that includes transmitter circuitry and components for transmitting signals. The receiver module 103 and the transmitter module 105 are both operative to tune to one or more frequency bands, where each frequency band covers one or more of the frequency channels used in BT communication. When tuned to a frequency band, the transceiver 102 can selectively receive and transmit packets on the frequency channels in that frequency band.

Although not illustrated in the drawings, the circuitry and components of the receiver module 103 and the transmitter module 105 can include circuitry and components commonly found in BT devices. Examples of such transmitter circuitry and components may include, but are not limited to, one or more antennas for transmitting radio signals across a frequency band supported by the BT standard, one or more pre-select filter in signal communication with the one or more antennas that is/are configured to be tuned so as to select signals received in one of the frequency channels, a low-noise amplifier (LNA) in signal communication with the one or more pre-select filter that increases the signal strength in the selected frequency channel and to prevent noise in subsequent stages from contributing materially to signal sensitivity, in-phase (I) and quadrature (Q) mixers in signal communication with the LNA and a local oscillator (LO) for recovering the I and Q components of the signal in the selected frequency channel, and additional filters for filtering the I and Q signal components, as well as demodulator circuitry (e.g., GFSK demodulators) for demodulating the signals, and analog-to-digital converters (ADC) for digitizing the demodulated output signals. Examples of such receiver circuitry and components may include, but are not limited to, digital-to-analog converters (DAC) for converting an information-bearing digital signal to an information-bearing analog signal, modulator circuitry (e.g., GFSK modulators) for modulating the information-bearing signals, mixers for up-converting the modulated signals to radio frequency (RF) in the desired BT frequency channel, amplifier circuitry (e.g., medium power amplifier) or amplifying the up-converted signals, and one or more antenna for transmitting the radio signals across a frequency band supported by the BT standard.

As should be understood by those skilled in the art, the receiver module 103 and the transmitter module 105 may share one or more components, such as, for example, antennas and/or tuners. In addition, signal reception and transmission by the transceiver 102 can be performed according to a relevant receive/transmit scheme, such as, for example, time division duplexing.

The storage/memory 104 is configured to maintain a UAP data record and a channel data record for each selected LAP value (e.g., each 24-bit LAP). The UAP and channel data records are data structures, the contents of which will now be described.

For each selected LAP value, the UAP data record is a data structure having two fields, namely a (first field) candidate UAP field, and a (second field) candidate channel sequence field. The candidate UAP field can include a plurality of entries, where each entry corresponds to a different candidate UAP value corresponding to the 4 least significant bits of the UAP (designated as UAP0-3). Each UAP value entry (designated UAP0-3) can take on one of 16 possible values ($2^4$=16), and in certain implementations can be represented in decimal as an integer in the range of 0-15 (inclusive). When the UAP data record is initialized, all 16 possible UAP values are represented in the candidate UAP field.

Note that the LAP value and the candidate UAP values can be representative of a page scanning device with which the paging device 10 is attempting to establish a connection (which can be a page scanning device with which the paging device established a connection in the past).

The candidate channel sequence field can include a plurality of entries, each associated with a respective candidate UAP value from the candidate UAP field. Each entry of the candidate channel sequence field is a candidate channel sequence, namely a candidate PHS/PRHS, that is computed based on the input LAP value and the associated candidate UAP value, i.e., UAP0-3 (since the PHS is derived from the LAP and the 4 least significant bits of the UAP).

For each selected LAP value, the channel data record is a data structure having three fields, namely a (first) channel value field, a (second) timestamp field, and a (third) UAP count field. Each entry in the channel value field is, for example, a channel ID/number (e.g., 0-78), that represents a given one of the 79 possible BT channels. For each entry of the channel value field, there is an associated timestamp in the timestamp field that represents that last time the channel was used by the system 100, and an associated UAP count in the UAP count field. For each entry in the channel value field, the associated UAP count is an integer value that represents the number of UAP values in which the channel value is represented in the PHS/PRHS associated with the UAP value.

The I/O interface 106 (also referred to simply as "the interface") allows a user or operator of the system 100 to provide one or more input parameters to the system 100, and may also provide an interface for outputting information. For example, the interface 106 can be used to provide as input an LAP value, and output FHS packet parameters associated with the input LAP value. The interface 106 can be implemented in various ways, including, for example, as a graphical user interface (GUI), a command line interface, an application programming interface (API), or any combination thereof.

The controller 108 is linked to the transceiver 102, the storage/memory 104, and the interface 106. The controller 108 is operative to receive, via the interface 106, an input LAP value. In certain cases, the LAP value is previously extracted from a previously received ID packet, and can be representative of the 24-bit LAP of a page scanning device.

Upon receipt of an LAP value as input (via, for example, the interface 106), the controller 108 initializes the UAP data record and the channel data record associated with the input LAP value. In a particularly preferred but non-limiting implementation, the controller 108 iterates over the candidate UAP values and initializes the UAP data record by setting each entry of the candidate UAP field to an integer value (0-15) corresponding to the decimal value of the binary representation of UAP0-3, and computing/calculating for each candidate UAP value from the candidate UAP field an associated candidate channel sequence (i.e., PHS/PRHS) based on the input LAP value and the UAP0-3.

The following table shows an example of part of a UAP data record for a given input LAP value:

| UAP0-3 | PHS/PRHS |
| --- | --- |
| 0 | [11, 17, 69, 6, 22, 61, 57, 24, 37, 55, 20, 73, 18, 56, 42, 34, 64, 40, 71, 19, 0, 60, 44, 70, 35, 1, 45, 72, 47, 77, 74, 4] |
| 1 | [6, 34, 47, 55, 38, 61, 40, 33, 4, 2, 78, 16, 31, 29, 41, 12, 50, 72, 70, 69, 66, 56, 75, 3, 26, 37, 27, 18, 64, 63, 5, 11] |
| ... | ... |
| ... | ... |
| 15 | [28, 64, 38, 50, 34, 73, 57, 78, 75, 68, 2, 70, 59, 48, 23, 6, 25, 61, 18, 47, 7, 63, 4, 20, 29, 11, 17, 71, 32, 21, 41, 12] |

As can be seen in the example illustrated in the above table, the UAP value 0 (e.g., the decimal value of the binary representation of UAP0-3=0000) has an associated PHS/PRHS [11, 17, 69, 6, 22, 61, 57, 24, 37, 55, 20, 73, 18, 56, 42, 34, 64, 40, 71, 19, 0, 60, 44, 70, 35, 1, 45, 72, 47, 77, 74, 4], the UAP value 1 (e.g., the decimal value of the binary representation of UAP0-3=0001) has an associated PHS/PRHS [6, 34, 47, 55, 38, 61, 40, 33, 4, 2, 78, 16, 31, 29, 41, 12, 50, 72, 70, 69, 66, 56, 75, 3, 26, 37, 27, 18, 64, 63, 5, 11], and the UAP value 15 (e.g., the decimal value of the binary representation of UAP0-3=1111) has an associated PHS/PRHS [28, 64, 38, 50, 34, 73, 57, 78, 75, 68, 2, 70, 59, 48, 23, 6, 25, 61, 18, 47, 7, 63, 4, 20, 29, 11, 17, 71, 32, 21, 41, 12].

After initializing the UAP data record, the controller 108 initializes the channel data record. The controller 108 scans through the PHS/PRHS in the UAP data record and creates a channel value entry in the channel data record for each channel that is represented in the PHS/PRHS field associated with at least one UAP value. For each channel value, the controller 108 initializes the UAP count field by counting the number UAP entries that reference the channel value in the associated PHS/PRHS. In the example in the above table, channel 11 appears in the PHS/PRHS associated with three UAP entries (UAP values 0, 1 and 15). Assuming that channel 11 does not appear in any other PHS/PRHS, the controller 108 would initialize the UAP count field associated with channel 11 to three.

The timestamp field associated with each channel value is initialized to null or empty, since upon initialization of the data records none of the channels have been used by the system 100.

After the controller 108 initializes the UAP data record and the channel data record, the system 100 begins the process of attempting to receive packets in order to extract information associated with the paging device 10. The process is a two-stage process, where in the first stage the system attempts to receive or intercept ID packets transmitted by the paging device 10 (that could be destined for the page scanning device 12). In the second stage, the system 100 attempts to receive or intercept an FHS packet transmitted by the paging device 10.

The following paragraphs describe steps of the first stage, i.e., receiving ID packets by the system 100. The controller 108 first selects one or more frequency bands based on the channel values in the channel data record, and then commands the transceiver 102 to tune to the selected frequency bands. The number of selected frequency bands is preferably, but not necessarily, equal to the number of frequency bands to which the transceiver 102 can be concurrently/simultaneously tuned. In certain preferred embodiments, the controller 108 employs one or more criteria for selecting the frequency band. Such criteria can include, for example, favoring frequency bands that cover channels having a high associated UAP count over channels having a low associated UAP count (i.e., favoring frequency bands having channels associated with more UAP values), and favoring frequency bands that cover channels having associated timestamp fields that indicate less recent use by the system 100 over channels having associated timestamp fields that indicate more recent use by the system 100.

After the controller 108 selects the one or more frequency bands, the controller 108 updates the timestamp field in the channel data record for each of the channels in the selected frequency bands. The controller 108 then commands the transceiver to tune to the selected frequency bands by, for example, tuning a tuner of the receiver module 103. The controller 108 can also instruct the transceiver 102, as part of or in addition to the tuning step, to filter any received packets based on the input LAP value such that only ID packets having the input LAP value embedded in the sync word are received by the transceiver 102.

While the transceiver 102 is tuned to the appropriate frequency band(s), the controller 108 waits, for a receive interval/window/duration/period, for the transceiver 102 to receive packets in the frequency band(s). In particular, the controller 108 waits for at least half of a time slot, i.e., at least 312.5 μs.

If no packets are received by the transceiver 102 during the receive interval, the controller 108 can re-tune the transceiver 102 to select another/different frequency band or bands, and then wait to receive a packet during another receive interval. If, however, a packet is received by the transceiver 102 during the receive interval, the controller 108 processes the received packet by checking whether the received packet is an ID packet. If the packet is not an ID packet, then the controller 108 either re-tune the transceiver 102 to select another/different frequency band or bands, or can continue waiting for one or more additional packets to arrive during the receive interval.

If the packet is an ID packet, the controller 108 takes further action, as will be described.

It is noted that the controller 108 can make the determination as to whether a received packet is an ID packet based on various criteria. For example, the controller 108 can analyze a received packet to determine the length of the packet (i.e., number of bits). Since ID packets are 68 bits, any received packet having more than 68 bits or fewer than 68 bits can be determined not to be an ID packet.

Optionally, if the transceiver 102 is not configured to filter packets associated with the input LAP value, the controller 108 can process the received ID packet to extract the LAP from the ID packet, and then compare the extracted LAP to the input LAP value. If the extracted LAP does not match the input LAP value, the controller 108 can either re-tune the transceiver 102 to select another/different frequency band or bands or alternatively continue waiting for additional packets to arrive during the receive time interval.

If the transceiver 102 is configured to filter packets associated with the input LAP value, or if the transceiver 102 is not configured to filter packets but the LAP value extracted from the received ID packet matches the input LAP value, the controller 108 synchronizes the system clock 110 with the timing of the received ID packet. The controller 108 then instructs the transceiver 102 to transmit, for example via the transmitter module 105, a reply ID packet to the paging device 10 during the next time slot using the same channel on which the transceiver 102 received the received ID packet.

The controller 108 then updates the UAP data record and the channel data record. The controller 108 updates the UAP data record by preferably iterating over the UAP value entries and removing/deleting UAP value entries having associated PHS/PRHS fields that do not include the channel on which the ID packet was received by the transceiver 102. The controller 108 updates the channel data record by updating the UAP count field, and removing/deleting all channel value entries having an associated UAP count value of 0.

The system 100 then performs steps for the second stage, i.e., receiving FHS packets. In general, since the system 100 received an ID packet during a given time slot and responded to the packet receipt by transmitting to the paging device 10 a reply ID packet (on the same channel as the received ID packet) during the next time slot, the paging device 10 is poised to respond to the received reply ID packet by transmitting an FHS packet. The system 100 can therefore attempt to receive the FHS packet. The controller 108 utilizes the updated UAP data record to perform various tasks/steps which enable the system 100 to receive the FHS packet. Generally speaking, the steps performed by the controller 108 include: i) identifying one or more channels on which an FHS packet could be received, ii) assigning a score/metric to each of the identified channels, iii) selecting one or more frequency bands covering some or all of the one or more channels, iv) tuning the transceiver 102 to the selected frequency band(s), and v) receiving and processing an FHS packet. Details of these steps will now be described.

The controller 108 identifies a set of channels, i.e., one or more channels, on which an FHS packet could be received. These channels, referred to as "second channels" are the channels which immediately follow the channel (the "first channel") on which the transceiver 102 received the ID packet (and transmitted the reply ID packet) in the PHS/PRHS remaining in the UAP data record.

For example, assume that the transceiver 102 received the ID packet on channel ID (i.e., channel number 11), and that only the following entries remain in the UAP data record after the controller 108 updated the UAP data record to remove/delete UAP value entries having associated PHS/PRHS fields that do not include channel 11:

| UAP0-3 | PHS/PRHS |
| --- | --- |
| 0 | [11, 17, 69, 6, 22, 61, 57, 24, 37, 55, 20, 73, 18, 56, 42, 34, 64, 40, 71, 19, 0, 60, 44, 70, 35, 1, 45, 72, 47, 77, 74, 4] |
| 1 | [6, 34, 47, 55, 38, 61, 40, 33, 4, 2, 78, 16, 31, 29, 41, 12, 50, 72, 70, 69, 66, 56, 75, 3, 26, 37, 27, 18, 64, 63, 5, 11] |
| 15 | [28, 64, 38, 50, 34, 73, 57, 78, 75, 68, 2, 70, 59, 48, 23, 6, 25, 61, 18, 47, 7, 63, 4, 20, 29, 11, 17, 71, 32, 21, 41, 12] |

As can be seen from the table, only UAP value entries 0, 1 and 15 have associated PHS/PRHS fields containing channel 11. The channel number that immediately follows channel 11 in the PHS/PRHS associated with UAP value 0 is channel 17 (underlined for emphasis). Similarly, the channel number that immediately follows channel 11 in the PHS/PRHS associated with UAP value 1 is channel 6 (underlined for emphasis), and the channel number that immediately follows channel 11 in the PHS/PRHS associated with UAP value 15 is channel 17 (underlined for emphasis).

In order to account for the case in which the "first channel" was the last channel of a train, the channel that immediately follows the "first channel" in each of the associated PHS/PRHS is in the +17 modulo 32 position in the PHS/PRHS. Thus, the channel number that is in position+17 modulo 32 after channel 11 in the PHS/PRHS associated with UAP value 0 is channel 40 (underlined and italicized for emphasis). Similarly, the channel number that is in position+17 modulo 32 after channel 11 in the PHS/PRHS associated with UAP value 1 is channel 50 (underlined and italicized for emphasis), and the channel number that is in position+17 modulo 32 after channel 11 in the PHS/PRHS associated with UAP value 15 is channel 2 (underlined and italicized for emphasis).

Thus, the "second channels" in the present example are channels 17, 40, 6, 50, and 2.

The set of "second channels" is also referred to as a set of selectable channels.

In preferred but non-limiting embodiments, the controller 108 assigns scores/metrics to each of the selectable channels according to one or more strategies. Such strategies can include, for example, randomly assigning scores to the selectable channels, assigning equal scores to all of the selectable channels, and preferably favoring selectable channels that appear in more than one PHS/PRHS over channels that appear in less PHS/PRHS. In the above example, channel 17 could be given a higher score by the controller 108 since channel 17 appears in the PHS/PRHS associated with two UAP values (UAP value 0 and 15).

The controller 108 then selects one or more frequency bands based on the selectable channels and associated scores. In certain preferred embodiments, the controller 108 employs one or more strategies for selecting the frequency band. Such strategies can include, for example, favoring frequency bands that cover selectable channels having higher scores over selectable channels having lower scores, and randomly selecting one or more frequency bands from the set of frequency bands that together cover all of the selectable channels.

After the controller 108 selects the frequency band(s), the controller 108 commands the transceiver 102 to tune to the selected frequency band(s). While the transceiver 102 is tuned to the appropriate frequency band(s), the controller 108 waits, for a necessary interval, for the transceiver 102 to receive packets in the frequency band(s).

At the end of the interval, or immediately or shortly after the transceiver 102 receives a packet, the controller 108 processes each of the received packets. The processing is generally performed in order to positively identify FHS packets. In certain embodiments, the controller 108 can process packets by checking the length of the received packet to determine the validity of the received packet as an FHS packet, and then filter out any invalid/non-FHS packets. As discussed above, the payload of FHS packets include 144 information bits and a 16-bit CRC (resulting in a 160-bit packet payload). In addition, FHS payloads are often forward error correction encoded using a rate 2/3 code, thus resulting in a 240-bit encoded payload. Thus, the controller 108 can filter out a received packet as a non-FHS packet if the payload of the received packet is not of a valid FHS packet length (i.e., if the received packet is not 240 bits in length).

After filtering out invalid/non-FHS packets based on packet payload length, the controller 108 can further process each received packet by attempting to un-whiten the packet using candidate clock values. As discussed above, the FHS packets are whitened using an LFSR (FIG. 5) whose initial state is derived from the 5 lower bits of the clock of the page scanning device that is being paged by the paging device 10 (e.g., the page scanning device 12). Thus, if the 5 lower bits of the clock are known, the whitening process can be reversed (referred to as un-whitening or de-whitening). Since 5 bits of the clock are used to initialize the states of the LFSR, there are $2^5=32$ candidate clock values that can be used in order to attempt to un-whiten the packet.

For a given one of the 32 candidate clock values, the controller 108 initializes the states of the LFSR and performs un-whitening of the packet to generate a candidate un-whitened/FHS packet. The controller 108 checks the validity of the candidate un-whitened packet as an FHS packet by analyzing one or more of the bit-fields of the candidate un-whitened packet. For example, the controller 108 can analyze some of the fields corresponding to the header of the candidate un-whitened packet to determine whether the candidate un-whitened packet is a valid FHS packet. For example, FHS packet headers include fields such as "packet type", which indicate the type of packet (e.g., the packet type field can explicitly state if the packet is an FHS packet). The controller 108 can analyze the bits in the "packet type" field of the packet header to determine whether or not the packet is a valid FHS packet. The controller 108 can also analyze some of the fields corresponding to the payload of the candidate un-whitened packet to determine whether the candidate un-whitened packet is a valid FHS packet. For example, the controller 108 can analyze the CRC bit fields in the candidate un-whitened packet payload to verify the CRC in order to determine FHS packet validity. In addition, the controller can analyze one or more of the "un-defined" field, the "reserved" field, the NAP and UAP fields, and/or the "class of device" field in the candidate un-whitened packet payload to determine whether the candidate un-whitened packet is an FHS packet. The two bits in the "un-defined" field of an FHS packet payload are expected to be 00. Thus, if a two-bit string other than 00 is present in the "un-defined" field, the controller 108 can determine that the packet is not a valid FHS packet. Similarly, the two bits in the "reserved" field of an FHS packet payload are expected to be 10. Thus, if a two-bit string other than 10 is present in the "reserved" field, the controller 108 can determine that the packet is not a valid FHS packet. The NAP and UAP fields of an FHS packet payload are expected to contain the OUI of the MAC address of the paging device. Thus, if the manufacturer of the paging device is known (to the system 100), the controller 108 can match the manufacturer to the possible OUI values. If the manufacturer of the paging device is unknown (to the system 100), the controller 108 can attempt to match the NAP and UAP fields against a list of allocated OUIs (since not all possible OUI values are allocated). The controller 108 can use any of the above in combination with each other in order to check the validity of un-whitened packets as FHS packets.

If, for a given one of the candidate clock values, the controller 108 determines that the correspondingly generated candidate un-whitened packet is an FHS packet (using one or more of the above-described techniques), the system 100 deems the candidate un-whitened packet as an FHS packet (i.e., a valid packet). The controller 108 then performs further processing on the FHS packet to extract information that is in the FHS packet, including parameters of the FHS packet. Such information and parameters can include one or more of the fields of the FHS packet payload illustrated in FIG. 4, such as, for example, the LAP of the paging device 10 transmitting the FHS packet, the full 8-bit UAP of the paging device 10, a device type designating a type of the paging device 10, and the 26 most significant bits of the clock of the paging device 10.

If, on the other hand, the controller 108 determines that the correspondingly generated candidate un-whitened packet is not an FHS packet (i.e., not a valid packet), the controller 108 generates a candidate un-whitened packet using a different one of the 32 possible candidate clock values. The controller 108 can continue this process until the controller 108 determines that one of the generated candidate un-whitened packets is a valid FHS packet. If the controller 108 exhausts all 32 possible candidate clock values without identifying a valid FHS packet, the controller 108 returns to the first stage and selects one or more frequency bands based on remaining channel values in the channel data record in order to attempt to receive ID packets. If, however, there are no more available channels to which the transceiver 102 can be tuned (i.e., if the transceiver 102 was previously tuned to all possible channels without resulting in a received ID packet or a valid FHS packet), the controller 108 can re-initialize the UAP data record and the channel data record.

Figure 8B:
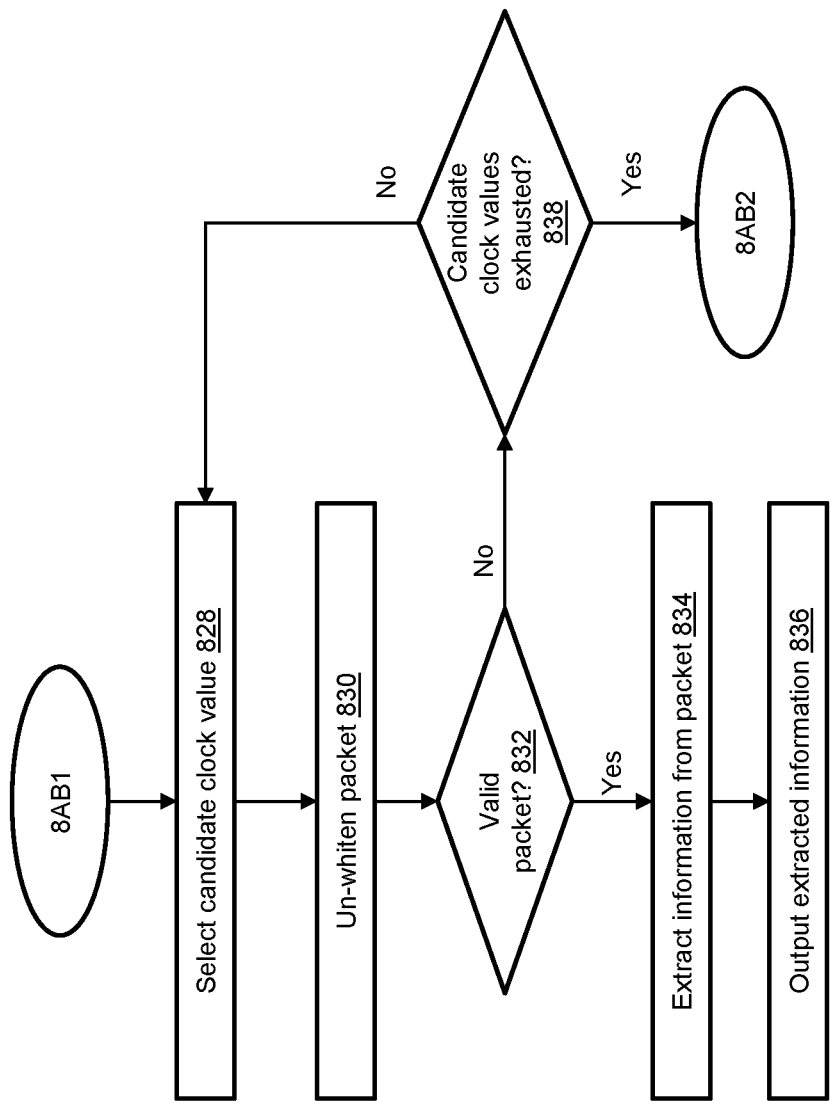

Attention is now directed to FIGS. 8A and 8B which show a flow diagram detailing a computer-implemented process 800 in accordance with embodiments of the disclosed subject matter. This computer-implemented process includes an algorithm for, among other things, receiving ID packets transmitted by a paging device (e.g., the paging device 10), and receiving and processing an FHS packet transmitted by the paging device. Reference is also made to FIGS. 1-7. The process and sub-processes are computerized processes performed by various components of the system 100, including the transceiver 102, the interface 106, and the controller 108. The process 800 enables the system 100 to ascertain (identify, extract, discover, etc.) information associated with paging devices (e.g., the paging device 10 of FIG. 6) that is embedded/contained/carried in FHS packets as parameters of the packet. The aforementioned processes and sub-processes are for example, performed automatically, but can be, for example, performed manually, and are performed, for example, in real time.

The process 800 begins at step 802, where an LAP value is input via the interface 106. The LAP value can be, for example, representative of the 24-bit LAP of a page scanning device (e.g., the device 12), and extracted from a previously received ID packet. At step 804 the controller 108 initializes a UAP data record and a channel data record for the input LAP value. Next, at step 806 the controller 108 selects one or more frequency bands based on the channel values in the channel data record, and then commands the transceiver 102 to tune to the selected frequency bands. Optionally, the controller 108 can assign scores between the execution of steps 804 and 806 in order to aid in selection of the frequency bands. The controller 108 then waits during a receive interval for the transceiver 102 to receive a packet. If a packet is received at step 808, the process 800 moves to step 810. If a packet is not received, the process 800 returns to step 806 where the controller 108 re-tunes the transceiver 102.

At step 810, the controller 108 checks if the received packet is an ID packet. If the packet is not an ID packet, the process 800 returns to step 806 where the controller 108 re-tunes the transceiver 102. If the packet is an ID packet, the process 800 can optionally move from step 810 to step 812, where the controller 108 extracts the LAP from the ID packet and checks whether the extracted LAP value matches the input LAP value. If the LAP value matches, the process 800 moves to step 814. Alternatively, if the transceiver 102 is configured to filter packets associated with the input LAP value, the process 800 can move directly to step 814 if it is determined at step 810 that the received packet is an ID packet.

At step 814, the controller 108 synchronizes the system clock 110 with the timing of the received ID packet and instructs the transceiver 102 to transmit a reply ID packet to the paging device during the next time slot using the same channel on which the transceiver 102 received the received ID packet (step 808).

The process 800 then moves to step 816, where the controller 108 updates the UAP data record and the channel data record. The process 800 then moves to step 818, where the controller 108 identifies the set of "second channels" that immediately follow the "first channel" on which the ID packet was received (step 808) in the channel sequences (PHS/PRHS) in the UAP data record that was updated at step 816.

At step 820, the controller 108 assigns scores to each of the identified second channels. At step 822 the controller 108 selects one or more frequency bands that cover one or more of the second channels based on the scores assigned at step 820, and then commands the transceiver 102 to tune to the selected frequency bands. The controller then waits during a receive interval for the transceiver 102 to receive a packet at step 824. The packets received at step 824 are candidate FHS packets.

Following step 824, the controller 108 begins performing tasks related to processing one or more packets received at step 824 in order to determine whether one of the packets is an FHS packet. The controller 108 can process the packets in parallel, one at a time, or in groups.

In a preferred but non-limiting implementation, at step 826 the controller 108 processes each of the packets received at step 824 by checking the length of the received packet to determine the validity of the received packet as an FHS packet. For example, and as discussed above, if the length of the payload of the received packet does not match the length of the payload of an FHS packet, the controller 108 determines that the packet is not a valid FHS packet. If none of the packets received at step 824 are valid FHS packets (based on packet payload length), the process 800 can return to step 806 and re-tune the transceiver to a new set of frequency bands based on the channel values in the channel data record.

For each packet received at step 824 that is of a valid FHS packet length, the process 800 moves from step 826 to step

828, where the controller 828 begins to attempt to un-whiten the packet. For example, at step 828 the controller can select a candidate clock value from the 32 possible clock values. At step 830 the controller 108 un-whitens the packet to generate a candidate un-whitened/FHS packet using the LFSR (FIG. 5) with states initialized to the selected candidate clock value. At step 832 the controller 108 checks the validity of the candidate un-whitened packet as an FHS packet by analyzing one or more of the bit-fields of the candidate un-whitened packet. If the candidate un-whitened packet is a valid packet, the candidate un-whitened packet is deemed a valid FHS packet and the process moves to step 834, where the controller 108 extracts information and parameters from the FHS packet. The information and parameters can be embedded in the payload of the FHS packet, as discussed above. The process 800 then moves to step 836, where the controller 108 sends the extracted information and parameters to the interface 106, which outputs the information and parameters. The process 800 then ends, i.e., is terminated after step 836, and can be re-started for a new LAP value.

If at step 832 the controller 108 determines that the candidate un-whitened packet is not a valid FHS packet, the process 800 moves to step 838, where the controller 108 checks if all 32 possible candidate clock values have been exhausted. If all candidate clock values are not exhausted, the process 800 moves from step 838 to step 828, where the controller 108 selects a next candidate clock value from the 32 possible clock values. If all candidate clock values are exhausted, the process 800 moves from step 838 to step 806.

It is noted that at any point at which the process 800 returns to step 806, the controller 108 can first check whether there are any available channels to which the transceiver 102 can be tuned (i.e., if the transceiver 102 was not previously tuned to all possible channels without receiving an ID packet or a valid FHS packet). In instances in which there are no available channels left to be tuned, the process 800 can instead return to step 804, where the controller 108 re-initializes the UAP data record and the channel data record for the particular LAP input value.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for obtaining information associated with a first device attempting to establish communication with a second device having a media access control (MAC) address that includes a lower address part (LAP) and an upper address part (UAP), the method comprising:
   receiving a first packet, transmitted by the first device, at a transceiver while tuned to a frequency band at least covering a first channel represented in one or more candidate channel sequences, each candidate channel sequence being based on an LAP value and a corresponding candidate UAP value;
   identifying one or more second channels that each immediately follow the first channel in a corresponding one of the one or more candidate channel sequences;
   receiving a second packet, transmitted by the first device, at the transceiver while tuned to a frequency band at least covering one of the second channels; and
   processing the received second packet to determine whether the second packet is a valid packet.

2. The method of claim 1, further comprising: transmitting, by the transceiver, a reply packet to the first device in response to receipt of the first packet at the transceiver, and wherein the first device transmits the second packet in response to receipt of the reply packet.

3. The method of claim 1, wherein processing the received second packet includes: extracting information from the received second packet if the received second packet is determined to be a valid packet.

4. The method of claim 3, wherein the information includes at least one of: the LAP of the first device, the UAP of the first device, a device type designating a type of the first device, a number of most significant bits of a clock of the first device.

5. The method of claim 1, wherein processing the received second packet includes: checking a length of the received second packet.

6. The method of claim 1, wherein the second packet is whitened by the first device prior to transmission using a linear feedback shift register that is initialized using values of a clock of the second device.

7. The method of claim 1, wherein processing the received second packet includes: un-whitening the second packet using a candidate value of a clock associated with the second device in order to generate a candidate un-whitened packet.

8. The method of claim 7, wherein processing the received second packet further includes: un-whitening the second packet using a different candidate value of the clock if the candidate un-whitened packet is not a valid packet.

9. The method of claim 1, wherein the first device previously established communication with the second device.

10. A system for obtaining information associated with a first device attempting to establish communication with a second device having a media access control (MAC) address that includes a lower address part (LAP) and an upper address part (UAP), the system comprising:
- a transceiver configured to receive a first packet, transmitted by the first device, while tune to a frequency band at least covering a first channel represented in one or more candidate channel sequences, each candidate channel sequence based on an LAP value and a corresponding candidate UAP value; and
- a controller in communication with the transceiver and configured to identify one or more second channels that each immediately follow the first channel in a corresponding one of the one or more candidate channel sequences,
- wherein the transceiver is further configured to receive a second packet, transmitted by the first device, while tuned to a frequency band at least covering one of the second channels, and
- wherein the controller is further configured to process the received second packet to determine whether the second packet is a valid packet.

11. The system of claim 10, wherein the controller is further configured to instruct the transceiver to transmit a reply packet to the first device in response to receipt of the first packet at the transceiver, and wherein the first device transmits the second packet in response to receipt of the reply packet.

12. The system of claim 10, wherein the controller is configured to extract information from the received second packet if the controller determines that the received second packet is a valid packet.

13. The system of claim 12, wherein the information includes at least one of: the LAP of the device, the UAP of the device, a device type designating a type of the device, a number of most significant bits of a clock of the device.

14. The system of claim 10, wherein the controller is configured to process the received second packet by at least checking a length of the received second packet.

15. The system of claim 10, wherein the second packet is whitened prior to transmission by the first device using a linear feedback shift register that is initialized using values of a clock of the second device.

16. The system of claim 10, wherein the controller is configured to process the received second packet by at least: un-whitening the received second packet using a candidate value of a clock associated with the second device in order to generate a candidate un-whitened packet.

17. The system of claim 16, wherein the controller is further configured to process the received second packet by un-whitening the received second packet using a different candidate value of the clock if the controller determines that the candidate un-whitened packet is not a valid packet.

18. The system of claim 10, further comprising: an interface associated with the controller for inputting to the controller an LAP value representative of the LAP of the second device.

19. A method performed during a process initiated by a first device to establish communication with a second device, each of the first and second devices having a media access control (MAC) address that includes a lower address part (LAP) and an upper address part (UAP), the method comprising:
- receiving as input an LAP value representative of the LAP of the second device;
- initializing a UAP data record to include:
  - a plurality of candidate UAP values associated with the UAP of the second device, and
  - for each candidate UAP value, a corresponding candidate channel sequence based on the LAP value and the candidate UAP value;
- receiving at a transceiver a first packet, transmitted by the first device, on a first channel represented in at least one of the candidate channel sequences;
- identifying at least one second channel that follows the first channel in a corresponding one of the at least one channel sequence;
- receiving at the transceiver a second packet, transmitted by the first device, on one of the identified at least one second channel; and
- processing the received second packet using candidate values of a clock of the second device to determine whether the received second packet is a valid packet.

* * * * *